(12) United States Patent
Edlund et al.

(10) Patent No.: US 6,376,113 B1
(45) Date of Patent: Apr. 23, 2002

(54) INTEGRATED FUEL CELL SYSTEM

(75) Inventors: David J. Edlund, Bend; William A. Pledger, Sisters, both of OR (US)

(73) Assignee: IdaTech, LLC, Bend, OR (US)

(*) Notice: Subject to any disclaimer, the term of this patent is extended or adjusted under 35 U.S.C. 154(b) by 0 days.

(21) Appl. No.: 09/190,917

(22) Filed: Nov. 12, 1998

(51) Int. Cl.$^7$ ................................................ H01M 8/06
(52) U.S. Cl. .......................................... 429/19; 429/17
(58) Field of Search ............................ 429/12, 13, 14, 429/30, 26, 20, 34, 19, 17

(56) References Cited

U.S. PATENT DOCUMENTS

| | | |
|---|---|---|
| 3,094,391 A | 6/1963 | Mader |
| 3,336,730 A | 8/1967 | McBride et al. |
| 3,338,681 A | 8/1967 | Kordesch |

(List continued on next page.)

FOREIGN PATENT DOCUMENTS

| | | |
|---|---|---|
| EP | 0434562 A1 | 6/1991 |
| EP | 1065741 A2 | 1/2001 |
| GB | 1037423 | 5/1963 |

(List continued on next page.)

OTHER PUBLICATIONS

English abstract of Japanese Patent No. 514790, 1993.
English abstract of Japanese Patent No. 828793, 1996.
English abstract of Japanese Patent No. 4–163860.
English abstract of Japanese Patent No. 4–338101.
Piwetz et al., "Hydrodesulfurization and Prereforming of Logistic Fuels for Use in Fuel Cell Applications," presented at the 1996 Fuel Cell Seminar held Nov. 17–20, 1996 in Orlando, Florida, pp. 780–783.
Privette et al., "Status of SOFCo SOFC Technology Development," presented at the 1996 Fuel Cell Seminar held Nov. 17–20, 1996 in Orlando, Florida, pp. 206–209.
English language abstract, Japanese Patent No. 6176779 A, 1994.
English language abstract, Japanese Patent No. 11116202 A, 1995.
English language abstract, Japanese Patent No. 7057758 A, 1999.
English language abstract, German language PCT Patent Application Serial No. WO 00/04600, 2000.
Adris, A. M., et al., "A Fluidized Bed Membrane Reactor for the Steam Reforming of Methane," The Canadian Journal of Chemical Engineering, vol. 69, pp. 1061–1070 (Oct., 1991).
Amphlett, J. C., et al., "On Board Hydrogen Purification for Steam Reformer/PEM Fuel Cell Vehicle Power Plants," Energy Progress X, Proceedings of the $10^{th}$ World Hydrogen Energy Conference, Cocoa Beach, Florida, U.S.A., vol. 3, pp. 1681–1690 (Jun., 1994).
Amphlett, J. C., et al., "Simulation of a 250 kW Diesel Fuel Processor/PEM Fuel Cell System," Fifth Grove Fuel Cell Symposium, Commonweatlh Institute, London, U.K., p. 8 (Sep. 22–25, 1997).

(List continued on next page.)

*Primary Examiner*—Gabrielle Brouillette
*Assistant Examiner*—M. Wills
(74) *Attorney, Agent, or Firm*—Kolisch, Hartwell, Dickinson, McCormack & Heuser, PC

(57) ABSTRACT

The invented system includes a fuel-cell system comprising a fuel cell that produces electrical power from air (oxygen) and hydrogen, and a fuel processor that produces hydrogen from a variety of feedstocks. One such fuel processor is a steam reformer which produces purified hydrogen from a carbon-containing feedstock and water. In the invented system, various mechanisms for implementing the cold start-up of the fuel processor are disclosed, as well as mechanisms for optimizing and/or harvesting the heat and water requirements of the system, and maintaining desired the feed ratios of feedstock to water in the fuel processor and purity of the process water used in the system.

37 Claims, 10 Drawing Sheets

U.S. PATENT DOCUMENTS

| | | |
|---|---|---|
| 3,350,176 A | 10/1967 | Green et al. |
| 3,469,944 A | 9/1969 | Bocard et al. |
| 3,765,946 A | 10/1973 | Werner et al. |
| 3,787,038 A | 1/1974 | Tesner et al. |
| 3,849,076 A | 11/1974 | Gryaznov et al. |
| 3,857,735 A | 12/1974 | Louis et al. |
| 3,920,416 A | 11/1975 | Houseman |
| 3,955,941 A | 5/1976 | Houseman et al. |
| 3,980,452 A | 9/1976 | Krumm et al. |
| 3,982,910 A | 9/1976 | Houseman et al. |
| 4,003,343 A | 1/1977 | Lee |
| 4,003,725 A | 1/1977 | Bunn, Jr. et al. |
| 4,098,959 A | 7/1978 | Fanciullo |
| 4,098,960 A | 7/1978 | Gagnon |
| 4,127,393 A | 11/1978 | Timmins et al. |
| 4,132,668 A | 1/1979 | Gryaznov et al. |
| 4,134,739 A | 1/1979 | Gulden et al. |
| 4,197,152 A | 4/1980 | Palty et al. |
| 4,238,403 A | 12/1980 | Pinto |
| 4,302,177 A | 11/1981 | Fankhanel et al. |
| 4,315,893 A | 2/1982 | McCallister |
| 4,329,157 A | 5/1982 | Dobo et al. |
| 4,349,613 A | 9/1982 | Winsel |
| 4,381,641 A | 5/1983 | Madgavkar et al. |
| 4,387,434 A | 6/1983 | Moncrief, Jr. et al. |
| 4,400,182 A | 8/1983 | Davies et al. |
| 4,444,158 A | 4/1984 | Yoon |
| 4,466,253 A | 8/1984 | Jaster |
| 4,472,176 A | 9/1984 | Rubin |
| 4,473,622 A | 9/1984 | Chludzinski et al. |
| 4,533,607 A | 8/1985 | Sederquist |
| 4,553,981 A | 11/1985 | Fuderer |
| 4,567,857 A | 2/1986 | Houseman et al. |
| 4,583,583 A | 4/1986 | Wittel |
| 4,642,273 A | 2/1987 | Sasaki |
| 4,644,751 A | 2/1987 | Hsu |
| 4,650,814 A | 3/1987 | Keller |
| 4,654,063 A | 3/1987 | Auvil et al. |
| 4,657,828 A | 4/1987 | Tajima |
| 4,659,634 A | 4/1987 | Struthers |
| 4,670,359 A | 6/1987 | Beshty et al. |
| 4,684,581 A | 8/1987 | Struthers |
| 4,713,234 A | 12/1987 | Weirich et al. |
| 4,751,151 A | 6/1988 | Healy et al. |
| 4,781,241 A | 11/1988 | Misage et al. |
| 4,788,004 A | 11/1988 | Pinto et al. |
| 4,810,485 A | 3/1989 | Marianowski et al. |
| 4,820,594 A | 4/1989 | Sugita et al. |
| 4,838,897 A | 6/1989 | Amano et al. |
| 4,865,624 A | 9/1989 | Okada |
| 4,880,040 A | 11/1989 | Pierson et al. |
| 4,904,455 A | 2/1990 | Karafian et al. |
| 4,904,548 A | 2/1990 | Tajima |
| 4,946,667 A | 8/1990 | Beshty |
| 4,981,676 A | 1/1991 | Minet et al. |
| 5,030,661 A | 7/1991 | Lywood |
| 5,198,002 A | 3/1993 | Mei et al. |
| 5,200,278 A | 4/1993 | Watkins |
| 5,229,222 A | 7/1993 | Tsutsumi et al. |
| 5,326,550 A | 7/1994 | Adris et al. |
| 5,335,628 A | 8/1994 | Dunbar |
| 5,344,721 A * | 9/1994 | Sonai et al. .................. 429/20 |
| 5,354,547 A | 10/1994 | Rao et al. |
| 5,366,818 A | 11/1994 | Wilkinson et al. |
| 5,366,821 A | 11/1994 | Merritt et al. |
| 5,393,325 A | 2/1995 | Edlund |
| 5,401,589 A | 3/1995 | Palmer et al. |
| 5,417,051 A | 5/1995 | Ankersmit et al. |
| RE35,002 E | 7/1995 | Matsubara et al. |
| 5,432,710 A | 7/1995 | Ishimaru et al. |
| 5,449,848 A | 9/1995 | Itoh |
| 5,458,857 A | 10/1995 | Collins et al. |
| 5,478,662 A | 12/1995 | Strasser |
| 5,498,278 A | 3/1996 | Edlund |
| 5,509,942 A | 4/1996 | Dodge |
| 5,525,322 A | 6/1996 | Willms |
| 5,527,632 A | 6/1996 | Gardner |
| 5,612,012 A | 3/1997 | Soma et al. |
| 5,616,430 A | 4/1997 | Aoyama |
| 5,631,820 A | 5/1997 | Donnelly et al. |
| 5,637,259 A | 6/1997 | Galuszka et al. |
| 5,637,414 A | 6/1997 | Inoue et al. |
| 5,639,431 A | 6/1997 | Shirasaki et al. |
| 5,645,626 A | 7/1997 | Edlund et al. |
| 5,658,681 A | 8/1997 | Sato et al. |
| 5,677,073 A | 10/1997 | Kawatsu |
| 5,705,916 A | 1/1998 | Rudbeck et al. |
| 5,712,052 A | 1/1998 | Kawatsu |
| 5,714,276 A * | 2/1998 | Okamoto ...................... 429/17 |
| 5,734,092 A | 3/1998 | Wang et al. |
| 5,741,474 A | 4/1998 | Isomura et al. |
| 5,763,113 A | 6/1998 | Meltser et al. |
| 5,771,476 A | 6/1998 | Mufford et al. |
| 5,780,179 A | 7/1998 | Okamoto |
| 5,782,960 A | 7/1998 | Ogawa et al. |
| 5,795,666 A | 8/1998 | Johnssen |
| 5,798,186 A | 8/1998 | Fletcher et al. |
| 5,811,065 A | 9/1998 | Sterenberg |
| 5,814,112 A | 9/1998 | Elliot et al. |
| 5,821,185 A | 10/1998 | White et al. |
| 5,833,723 A | 11/1998 | Kuwabara et al. |
| 5,846,669 A | 12/1998 | Smotkin et al. |
| 5,858,314 A | 1/1999 | Hsu et al. |
| 5,861,137 A | 1/1999 | Edlund |
| RE36,148 E | 3/1999 | Strasser |
| 5,897,766 A | 4/1999 | Kawatsu |
| 5,897,970 A | 4/1999 | Isomura et al. |
| 5,932,181 A | 8/1999 | Kim et al. |
| 5,938,800 A | 8/1999 | Verrill et al. |
| 5,985,474 A | 11/1999 | Chen et al. |
| 5,997,594 A | 12/1999 | Edlund et al. |
| 5,998,053 A | 12/1999 | Diethelm |
| 6,007,931 A * | 12/1999 | Fuller et al. .................. 429/13 |
| 6,022,634 A | 2/2000 | Ramunni et al. |
| 6,042,956 A | 3/2000 | Lenel |
| 6,045,772 A | 4/2000 | Szydlowski et al. |
| 6,045,933 A | 4/2000 | Okamoto |
| 6,054,229 A | 4/2000 | Hsu et al. |
| 6,077,620 A * | 6/2000 | Pettit ........................... 429/26 |
| 6,083,637 A * | 7/2000 | Walz et al. ................... 429/17 |
| 6,103,411 A | 8/2000 | Matsubayashi et al. |
| 6,120,923 A * | 9/2000 | Van Dine et al. ............. 429/17 |
| 6,165,633 A * | 12/2000 | Negishi ........................ 429/17 |
| 6,171,574 B1 | 1/2001 | Juda et al. |
| 6,187,066 B1 | 2/2001 | Benz et al. |
| 6,190,623 B1 | 2/2001 | Sanger et al. |
| 6,201,029 B1 | 3/2001 | Waycuilis |
| 6,221,117 B1 | 4/2001 | Edlund et al. |
| 6,242,120 B1 | 6/2001 | Herron |

FOREIGN PATENT DOCUMENTS

| | | |
|---|---|---|
| JP | 57-145276 | 9/1982 |
| JP | 4163860 | 6/1992 |
| JP | 4338101 | 11/1992 |
| WO | WO 99/65097 | 12/1999 |
| WO | WO 00/02282 | 1/2000 |
| WO | WO 00/04600 | 1/2000 |

OTHER PUBLICATIONS

Chai, M., et al., "Promotion of Methane Steam Reforming Using Ruthenium–Dispersed Microporous Alumina Membrane Reactor," Chemistry Letters, The Chemical Society of Japan, pp. 41–44 (1993).

"Compact, Lightweight Fuel Reformer for Fuel Cells," Argonne National Laboratory/U.S. Department of Energy (Jul., 1996).

Edlund, Dr. David and William Pledger, "Development of a Compact and Economical Steam Reformer for Fuel–Cell Systems," Fifth Grove Fuel Cell Symposium, Commonwealth Institute, London, U.K., p. 6 (Sep. 22–23, 1997).

Edlund, David J. and William A. Pledger, "The Practical Use of Metal–Membrane Reactors for Industrial Applications," The 1995 Membrane Technology Reviews, pp. 89–97 (Nov., 1994).

Emonts, B., et al., "Compact Methanol Reformer Test for Fuel–Cell Powered Light–Duty Vehicles," Fifth Grove Fuel Cell Symposium, Commonwealth Institute, London, U.K., p. 42 (Sep. 22–25, 1997).

Emonts, B., et al., "Compact Methanol Reformer Test for Fuel–Cell Powered Light–Duty Vehicles," Fifth Grove Fuel Cell Symposium, Commonwealth Institute, London, U.K., (no page No.), (Sep. 22–25, 1997).

Jørgensen, S. Lægsgaard, et al., "Application of Pd–Membranes for the Production of Pure Hydrogen in Methanol–Based Fuel Cell Powered Vehicles," Proceedings of Fourth Workshop: Optimisation of Catalytic Membrane Reactor Systems, ESF Network, Catalytic Membrane Reactors, Oslo, Norway, pp. 51–57 (May 30–31, 1997).

Knapton, A. G., "Palladium Alloys for Hydrogen Diffusion Membranes," Platinum Metals Review, vol. 21, 44–50 (1977).

Ledjeff–Hey, K., et al., "Compact Hydrogen Production Systems for Solid Polymer Fuel Cells," Fifth Grove Fuel Cell Symposium, Commonwealth Institute, London, U.K., p. 17 (Sep. 22–25, 1997).

Menzer, R., et al., "Fuel Processing in Fuel Cell Systems for Mobile Applications—Gasoline as Energy Carrier On–Bord," Fifth Grove Fuel Cell Symposium, Commonwealth Institute, London, U.K., (no page No.), (Sep. 22–25, 1997).

Minet, R. G., et al., "Experimental Studies of A Ceramic Membrane Reactor for the Steam/Methane Reaction at Moderate Temperatures (400–700° C)," Symposium on Natural Gas Upgrading II Presented before The Division of Petroleum Chemistry, Inc., Meeting of American Chemical Society, San Francisco, California, U.S.A., pp. 245–248 (Apr., 1992).

Oertel, Michael, et al., "Steam Reforming of Natural Gas with Integrated Hydrogen Separation for Hydrogen Production," Chemical Engineering Techology, vol. 10, pp. 248–255 (1987).

Shu, J., et al., "Catalytic Palladium–Based Membrane Reactors: A Review," The Canadian Journal of Chemical Engineering, vol. 69, pp. 1036–1060 (Oct., 1991).

Teagan, W. P., et al., "Cost Reduction of Fuel Cells for Transportation Applications—Fuel Processing Options," Fifth Grove Fuel Cell Symposium, Commonwealth Institute, London, U.K. (Sep. 22–25, 1997).

* cited by examiner

INTEGRATED FUEL CELL SYSTEM

FIELD OF THE INVENTION

This invention relates generally to the design and operation of a system for producing electrical power. More specifically, the invention relates to a system for producing electrical power with a fuel cell, especially a proton-exchange-membrane fuel cell (PEMFC).

BACKGROUND AND SUMMARY OF THE INVENTION

Purified hydrogen is an important fuel source for many energy conversion devices. For example, fuel cells use purified hydrogen and an oxidant to produce an electrical potential. A process known as steam reforming produces by chemical reaction hydrogen and certain byproducts or impurities. A subsequent purification process removes the undesirable impurities to provide hydrogen sufficiently purified for application to a fuel cell.

In a steam reforming process, one reacts steam and a carbon-containing compound over a catalyst. Examples of suitable carbon-containing compounds include, but are not limited to, alcohols (such as methanol or ethanol) and hydrocarbons (such as methane or gasoline or propane). Steam reforming requires an elevated operating temperature, e.g., between 250 degrees centigrade and 1300 degrees centigrade, and produces primarily hydrogen and carbon dioxide. Some trace quantities of unreacted reactants and trace quantities of byproducts such as carbon monoxide also result from steam reforming. When a steam reforming unit, or fuel processor, is started from a cold, inactive state, it must be preheated to at least a minimum operating temperature before the above reforming reaction will take place. A need exists for efficient and alternative methods for this preheating of a steam reforming unit. Efficient operation of the fuel processor also requires careful indexing and control of the ratios of water and carbon-containing feedstock. It is also necessary to maintain and control the purity of the water feeds used with the steam reforming unit and fuel cell.

The invented system includes a fuel-cell system comprising a fuel cell that produces electrical power from air (oxygen) and hydrogen, and a fuel processor that produces hydrogen from a variety of feedstocks. One such fuel processor is a steam reformer which produces purified hydrogen from a carbon-containing feedstock and water. In the invented system, various mechanisms for implementing the cold start-up of the fuel processor are disclosed, as well as mechanisms for optimizing and/or harvesting the heat and water requirements of the system, and maintaining desired the feed ratios of feedstock to water in the fuel processor and purity of the process water used in the system.

Many other features of the present invention will become manifest to those versed in the art upon making reference to the detailed description which follows and the accompanying sheets of drawings in which preferred embodiments incorporating the principles of this invention are disclosed as illustrative examples only.

DETAILED DESCRIPTION OF THE PREFERRED EMBODIMENTS AND BEST MODE OF THE INVENTION

Figure 1:
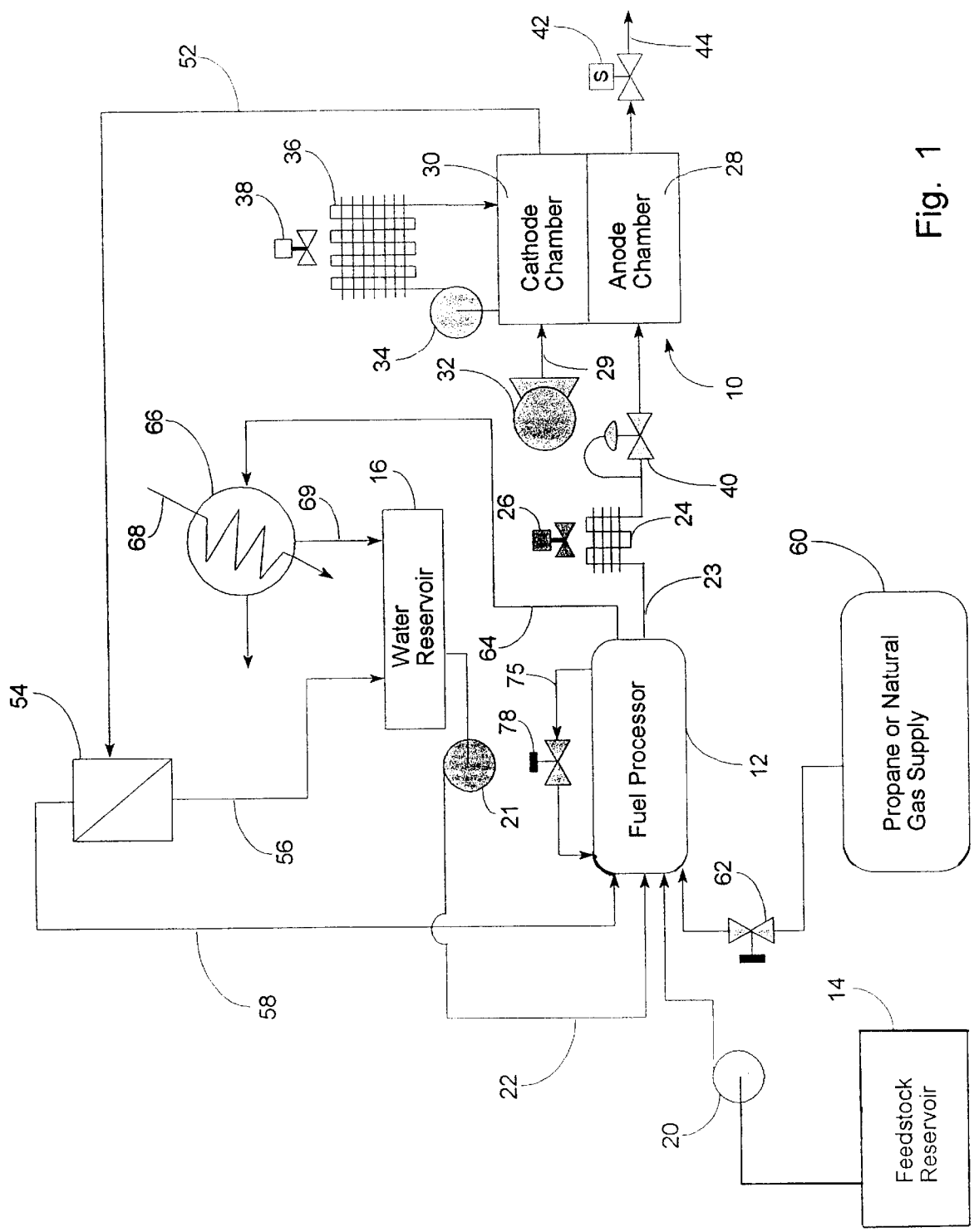
FIG. 1 is a process flow diagram of a fuel-cell system in which propane or natural gas is used as the fuel to heat the fuel processor during a cold start-up.

As shown in FIG. 1, the invention consists of a fuel-cell system comprising a fuel cell 10 that produces electrical power from air (oxygen) and hydrogen, and a fuel processor 12 that produces hydrogen from a variety of feedstocks. Generally, said fuel cell is a net producer of water, and said fuel processor 12 is a net consumer of water.

Fuel cell 10 is preferably a proton exchange membrane fuel cell (PEMFC) and may utilize internal humidification of air and/or hydrogen, including so called self-humidification, or external humidification of air and/or hydrogen. Fuel cell 10 produces byproduct water and byproduct heat in addition to electrical power.

Many feedstocks are suitable for producing hydrogen using fuel processor 12 including, but not limited to, carbon-containing compounds such as hydrocarbons, alcohols, and ethers. Ammonia is also a suitable feedstock. Fuel processor 12 preferably produces hydrogen by reacting the carbon-containing feedstock with water by a process commonly known as steam reforming. In this case fuel processor 12 consumes water in addition to consuming feedstock. It is within the scope of the present invention that other chemical methods for making hydrogen from a feedstock, such as partial oxidation and autothermal reforming, may also be used rather than steam reforming.

FIG. 1 is a process flow diagram for one embodiment of a fuel cell system of this invention. The fuel cell 10 receives hydrogen produced by the fuel processor 12. The fuel processor produces hydrogen by reacting, at high temperature, a feedstock from storage reservoir 14 and water from storage reservoir 16. Pump 20 moves feedstock from reservoir 14 and delivers said feedstock to the fuel processor 12. Likewise, pump 21 moves water from reservoir 16 and delivers said water as stream 22 to the fuel processor 12.

Pumps 20 and 21 deliver the feedstock and water to the fuel processor at a pressure ranging from ambient pressure to approximately 300 psig.

Hydrogen produced by the fuel processor is initially hot because the fuel processor must operate at elevated temperatures of 250° C. to 1300° C. The product hydrogen stream 23 from the fuel processor is cooled using heat exchanger 24 and fan 26 to blow cool ambient air over the hot heat exchanger surfaces. Once cooled to a temperature near to or lower than the operating temperature of the fuel cell, which typically is between approximately 0° C. and approximately 80° C., product hydrogen is passed into the anode chamber 28 of the fuel cell stack.

Air stream 29 is delivered to the cathode chamber 30 of said fuel cell stack 10 by a blower 32. Alternatively, a compressor could also be used in place of blower 32. An example of suitable blowers are centrifugal blowers because of their low noise during operation and low power requirements. However, centrifugal blowers are generally limited to relatively low delivery pressure, typically <2 psig. For higher delivery pressures, a linear compressor may be used. Linear compressors are based on an electromechanical (solenoid) drive that is characterized by relatively low power consumption and low noise. An example of a suitable linear compressor is Model Series 5200 sold by Thomas Compressors & Vacuum Pumps (Sheboygan, Wis.).

A coolant circulating loop is used to maintain the temperature of the fuel cell stack within acceptable limits, such as those described above. The coolant serves the purpose of cooling both the cathode and anode chambers of the fuel cell stack. To this end, coolant circulating pump 34 circulates hot coolant from the fuel cell stack into heat exchanger 36. Fan 38 blows cool air over the hot surfaces of heat exchanger 36, thereby reducing the temperature of the coolant. The coolant may be de-ionized water, distilled water, or other non-conducting and non-corrosive liquids including ethylene glycol and propylene glycol.

A pressure regulator 40 ensures that the pressure of the hydrogen supplied to the anode chamber 28 of said fuel cell 10 remains at an acceptable value. For most PEM fuel cells, this range of pressures is between ambient pressure to 4 atmospheres, with a pressure range between ambient pressure and approximately 1.5 atmospheres being preferred. Within the anode chamber of the fuel cell hydrogen is consumed and, at the same time, diluted with water vapor. Thus, a periodic purge of hydrogen-rich gas from the anode chamber is required. Purge valve 42 serves this purpose. The purge hydrogen represents a small amount of the total hydrogen supplied to the fuel cell, typically only about 1% to 10% of the total. The purge hydrogen stream 44 may be vented directly to the surroundings, as shown in FIG. 1, or it may be used for the purpose of producing heat, or for other purposes. In some embodiments of this invention hydrogen stream 23 may be flowed continuously in excess through anode chamber 28, eliminating the need for said purge valve 42. Since some liquid water may be entrained in said purge hydrogen stream 44, an optional water knock-out may be placed in purge stream 44 for the purpose of separating and collecting said entrained liquid water.

Excess air is continuously flowed through the cathode chamber 30. Typically the air flow rate is 200% to 300% of the stoichiometric requirement of oxygen to support the magnitude of electrical current produced by the fuel cell, although flow rates outside of this range may be used as well. Oxygen-depleted air is discharged from said cathode chamber 30 as stream 52. Stream 52 contains substantial water, as both liquid and vapor, available for recovery. Stream 52 is typically saturated with water vapor, and as an example, approximately one third or more of the total water may be freely condensed to liquid water. In one embodiment of this invention, stream 52 is first passed through a knock-out 54 that separates liquid water from the oxygen-depleted air and water vapor. Liquid water stream 56 flows out of said knock-out 54 and the liquid water is collected within water reservoir 16. The gas-phase stream 58 exiting knock-out 54 comprises the oxygen-depleted air and water vapor.

Stream 58 is directed into fuel processor 12 for the purpose of supporting combustion within said fuel processor to generate the required heat for satisfactory operation of the fuel processor (if the fuel processor is based on steam reforming), or to supply oxidant (oxygen) for partial-oxidation of the feedstock (if the fuel processor is based on partial oxidation or autothermal reforming). Since stream 58 is to be used for combustion, there is no primary reason to cool stream 58 or stream 52, other than to assist with separation of liquid water within said knock-out 54.

Still referring to FIG. 1, fuel processor 12 is preferably a steam reformer with internal hydrogen purification. Examples of suitable steam reforming units are disclosed in pending U.S. patent applications Ser. Nos. 08/741,057 and 08/951,091, which are both entitled "Steam Reformer With Internal Hydrogen Purification" and the disclosures of which are hereby incorporated by reference. As described previously, the process of steam reforming involves the chemical reaction of a feedstock with water at elevated temperature, and is generally known to those skilled in the art. The operating temperature is for steam-reforming is generally between approximately 250° C. and approximately 1300 ° C., and for most common alcohols and hydrocarbons (except methane) is in the range of approximately 250° C. and approximately 800° C. To initially heat fuel processor 12 during a cold start-up, a suitable fuel such as propane or natural gas is fed from a supply source 60 to the fuel processor. The fuel is combusted within the fuel processor 12 until the fuel processor is hot enough to begin steam reforming the feedstock. A throttle valve 62 regulates the flow of propane or natural gas fuel to the fuel processor during this cold start-up.

Combustion exhaust stream 64 exits the fuel processor as a hot gas stream laden with water vapor. The water vapor in said combustion exhaust stream 64 has essentially two sources: as a byproduct of burning the fuel, and as a component of air stream 58. It is desirable to recover the water from combustion exhaust stream 64 and to recover heat from said exhaust stream 64. Condenser 66 serves this purpose. Hot, moist exhaust stream 64 passes into said condenser 66 and is chilled using a cold fluid stream 68. Streams with temperatures near or less than 20° C. have proven effective. Liquid water condenses and flows out of condenser 66 as liquid stream 69, and is collected in water reservoir 16.

Cold fluid stream 68 is warmed by the process of passing hot exhaust stream 64 through said condenser 66. For example, cold outside air may serve as stream 68 and be heated for the purpose of space heating in a residential, commercial, or industrial application. Alternatively, cold water may serve as stream 68 and be heated for use as domestic or process hot water, or said hot water may be used for space heating or other heating applications. Yet another embodiment is that a cold fluid other than air or water including, but not limited to ethylene glycol and propylene glycol, serves as stream 68.

Once fuel processor 12 has reached a suitable temperature for steam reforming the feedstock, feed water and feedstock are pumped into said fuel processor. For methanol, this temperature should be at least 250° C., with temperatures of at least 450° C. and preferably at least 600° C. being used for most hydrocarbon feedstocks. The steam reforming reaction produces a hydrogen-rich reformate gas mixture that is preferably purified within the fuel processor, such as disclosed in our above-identified pending applications, which are incorporated by reference. The pure product hydrogen stream 23 is passed to the fuel cell as previously described. The hydrogen-depleted stream 75 that is rejected by the hydrogen purifier is passed through throttle valve 78 to be used as fuel for combustion to heat said fuel processor 12. At this time during the operation of fuel processor 12 there is no longer a need to supply propane or natural gas fuel that was used for the cold start-up, and that fuel supply is shut off.

Figure 2:
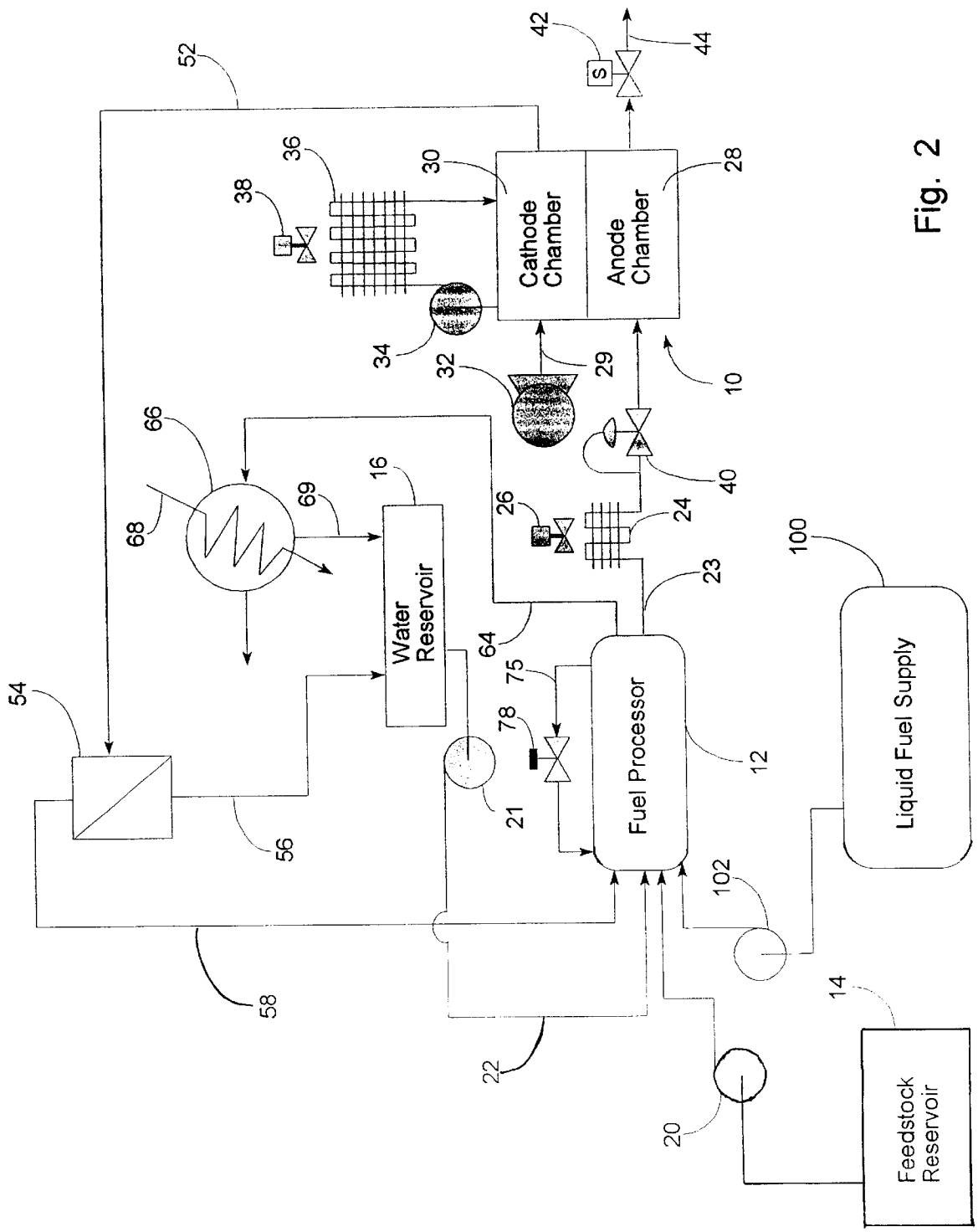
FIG. 2 is a process flow diagram of a fuel-cell system in which a liquid fuel is used to heat the fuel processor during a cold start-up.

FIG. 2 is another embodiment of the present invention in which the fuel processor 12 is heated during a cold start-up by combustion of a liquid fuel rather than propane or natural gas. The liquid fuel may be diesel, gasoline, kerosene, ethanol, methanol, jet fuel, or other combustible liquids. During a cold start-up, liquid fuel is removed from storage supply 100 using pump 102. The discharged liquid fuel from pump 102 is admitted through a suitable nozzle or jet into the combustion region in fuel processor 12 where the fuel is mixed with air and burned to heat said fuel processor. The liquid fuel may be vaporized or atomized prior to injection into fuel processor 12 to facilitate combustion.

Figure 3:
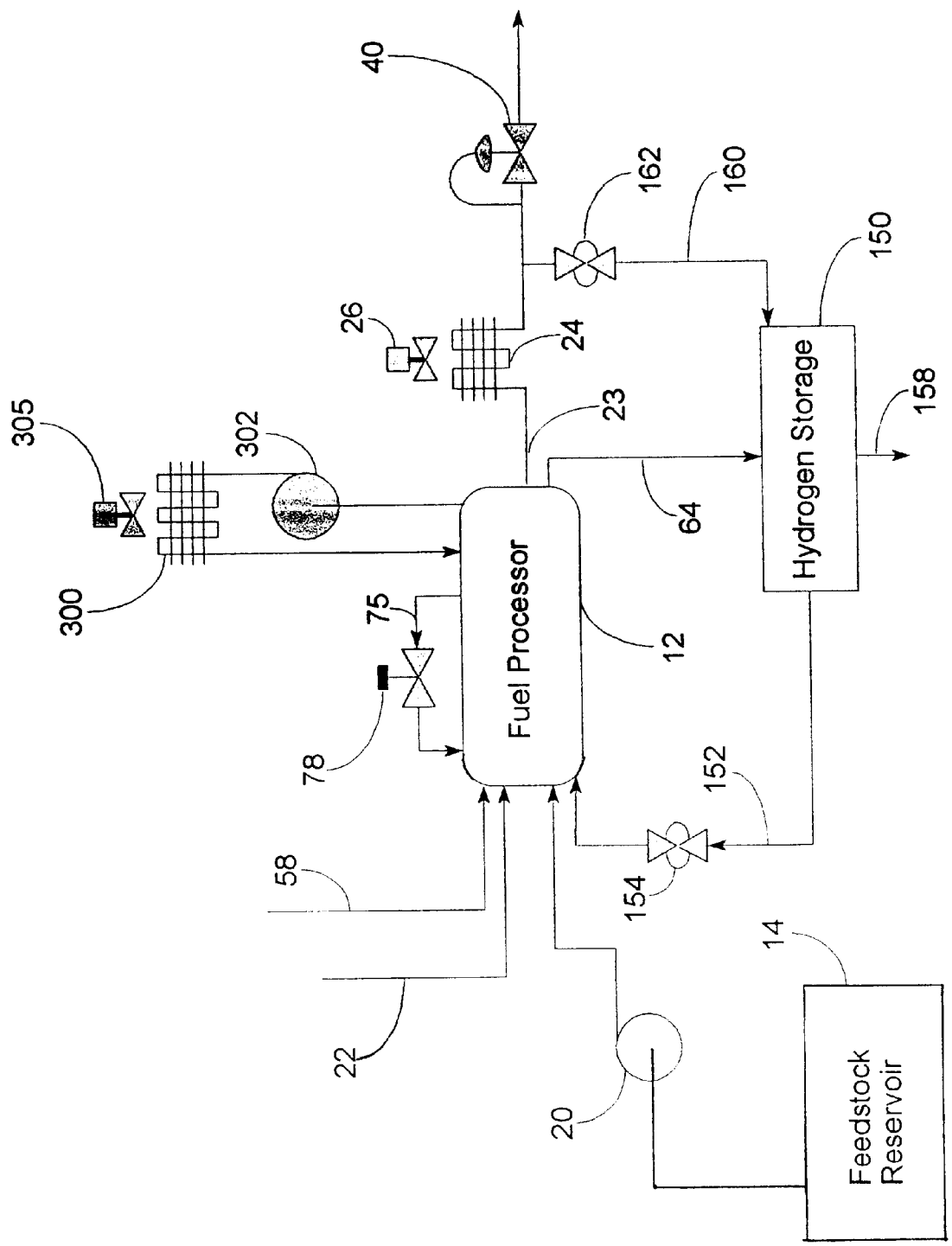
FIG. 3 is an embodiment of the invention in which stored hydrogen is used to heat the fuel processor during a cold start-up.

Yet another embodiment of the present invention related to cold start-up of fuel processor 12 is shown in FIG. 3. In this case cold start-up is accomplished by combustion of hydrogen fuel within fuel processor 12. Hydrogen fuel is stored by within hydrogen storage vessel 150 by any known method. An example of a particularly well-suited method for storing hydrogen fuel is as a metal hydride. Said metal hydride then comprises a metal hydride storage bed serving as storage vessel 150.

Metal hydrides exist in equilibrium with gaseous hydrogen (see F. A. Lewis, "The Palladium Hydrogen System" Academic Press, 1967; and "Hydrogen in Metals I: Basic Properties" edited by G. Alefeld and J Völkl, Springer-Verlag, 1978, the disclosures of which are hereby incorporated by reference). The equilibrium pressure of hydrogen gas over a given metal hydride is a function of the chemical composition of the metal hydride and the temperature of the system. Thus, it is possible to select a metal hydride chemical composition such that the equilibrium pressure of hydrogen over the metal hydride is between 0 psig (ambient pressure) and 10 psig at a temperature of about 15° C. to 22° C. Increasing the temperature of the metal hydride system increases the equilibrium pressure of hydrogen over the metal hydride.

Returning to FIG. 3 and for purposes of illustration, it is assumed that storage reservoir 150 contains a suitable quantity of a metal hydride, and is called a metal hydride bed. During a cold start-up, fuel hydrogen stream 152 is withdrawn from hydride storage bed 150 and, after passing through isolation valve 154, is admitted into fuel processor 12 where said hydrogen fuel is combusted to heat the fuel processor. As fuel hydrogen is withdrawn from storage bed 150, the pressure of gaseous hydrogen in said storage bed will begin to decrease and the bed will begin to cool in temperature (phenomena well known to those skilled in the art of hydrogen storage in metal hydride beds). To counteract these trends, warm combustion exhaust stream 64 is flowed through metal hydride storage bed 150 to heat said metal hydride bed. Then, the now cool exhaust exits the warmed metal hydride bed 150 as cool exhaust stream 158. This allows the pressure of gaseous hydrogen to remain sufficiently high to discharge most of, to nearly all of, the hydrogen from said storage bed 150.

Alternative embodiments of this invention would use other sources to heat metal hydride bed 150 including electrical resistance heaters and combustion of hydrogen or other fuel to directly heat storage bed 150.

After completing cold start-up of fuel processor 12 and hydrogen is being produced by the fuel processor, isolation valve 154 is closed and hydride storage bed 150 is recharged with hydrogen so that it will be ready for the next cold start-up. Recharging of storage bed 150 is accomplished by taking a hydrogen slip stream 160 from purified product hydrogen stream 23 after said product hydrogen stream has been cooled by passing through heat exchanger 24. During this hydrogen recharging operation, byproduct heat should be removed from hydride storage bed 150, such as through any known mechanism. An optional isolation valve 162 is placed in hydrogen slip stream 160 to facilitate maintenance.

An advantage of this embodiment of the invention is that the fuel required for cold start-up of fuel processor 12 is clean burning hydrogen, acquired from a previous period of operating the system. Thus, it is not necessary to periodically resupply an auxiliary fuel such as propane or diesel for start-up purposes, nor is it necessary to have a large external storage reservoir for said auxiliary fuels.

Figure 4:
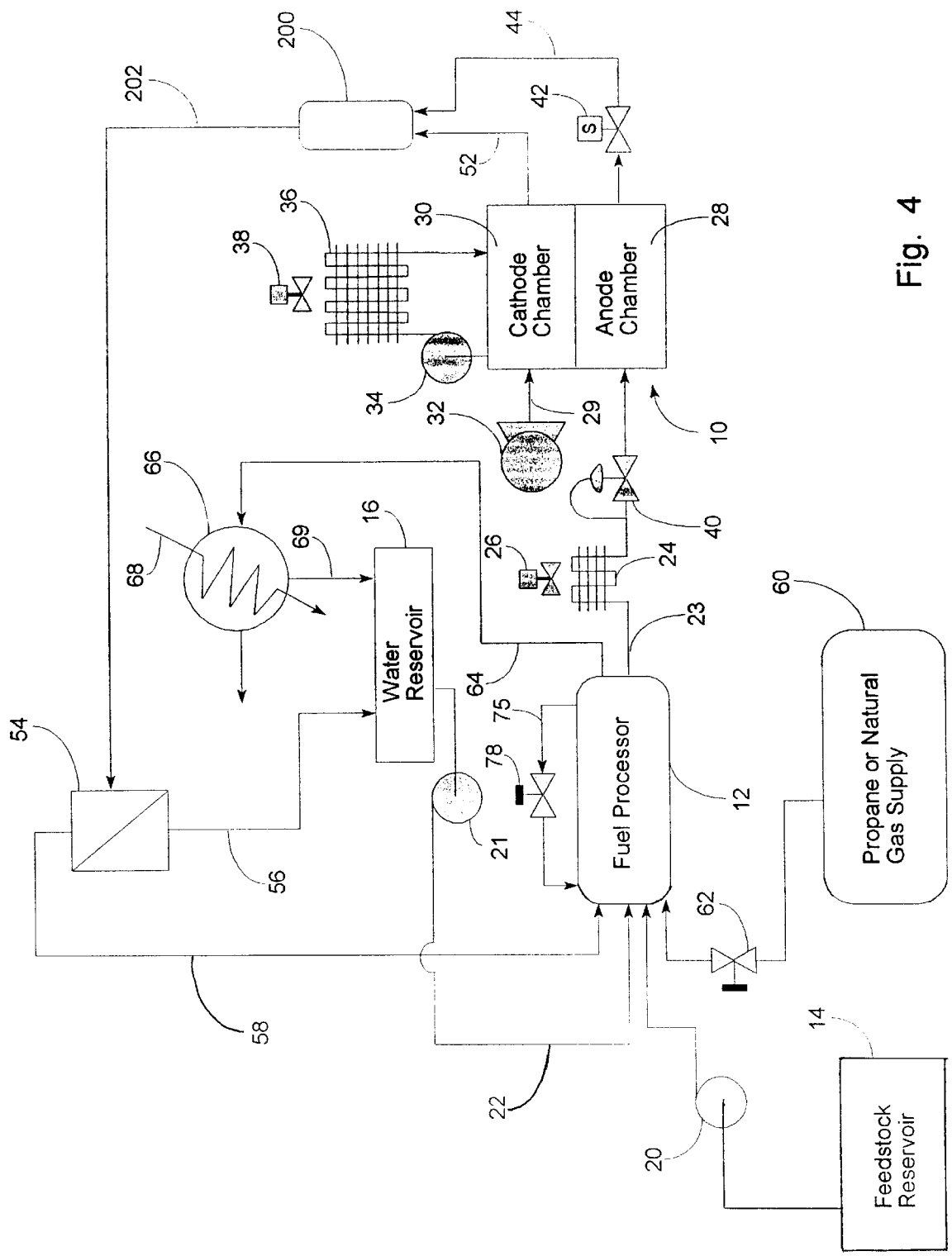
FIG. 4 is a process flow diagram of a fuel-cell system in which hydrogen purged from the anode chamber of the fuel cell is combusted to provide additional water for recovery and use.

FIG. 4 presents yet another embodiment of the present invention in which purge hydrogen stream 44 is passed into combustor 200 for the purpose of generating additional water to be recovered ultimately by knock-out 54 and condenser 66. Combustor 200 may be catalytic or non-catalytic. Air to support combustion of purge hydrogen stream 44 is supplied by the cathode exhaust stream 52 which is depleted, but not devoid, of oxygen as described previously. The single outlet from combustor 200 is exhaust stream 202 that is enriched in water (vapor and liquid) as a result of burning purge hydrogen stream 44.

Figure 5:
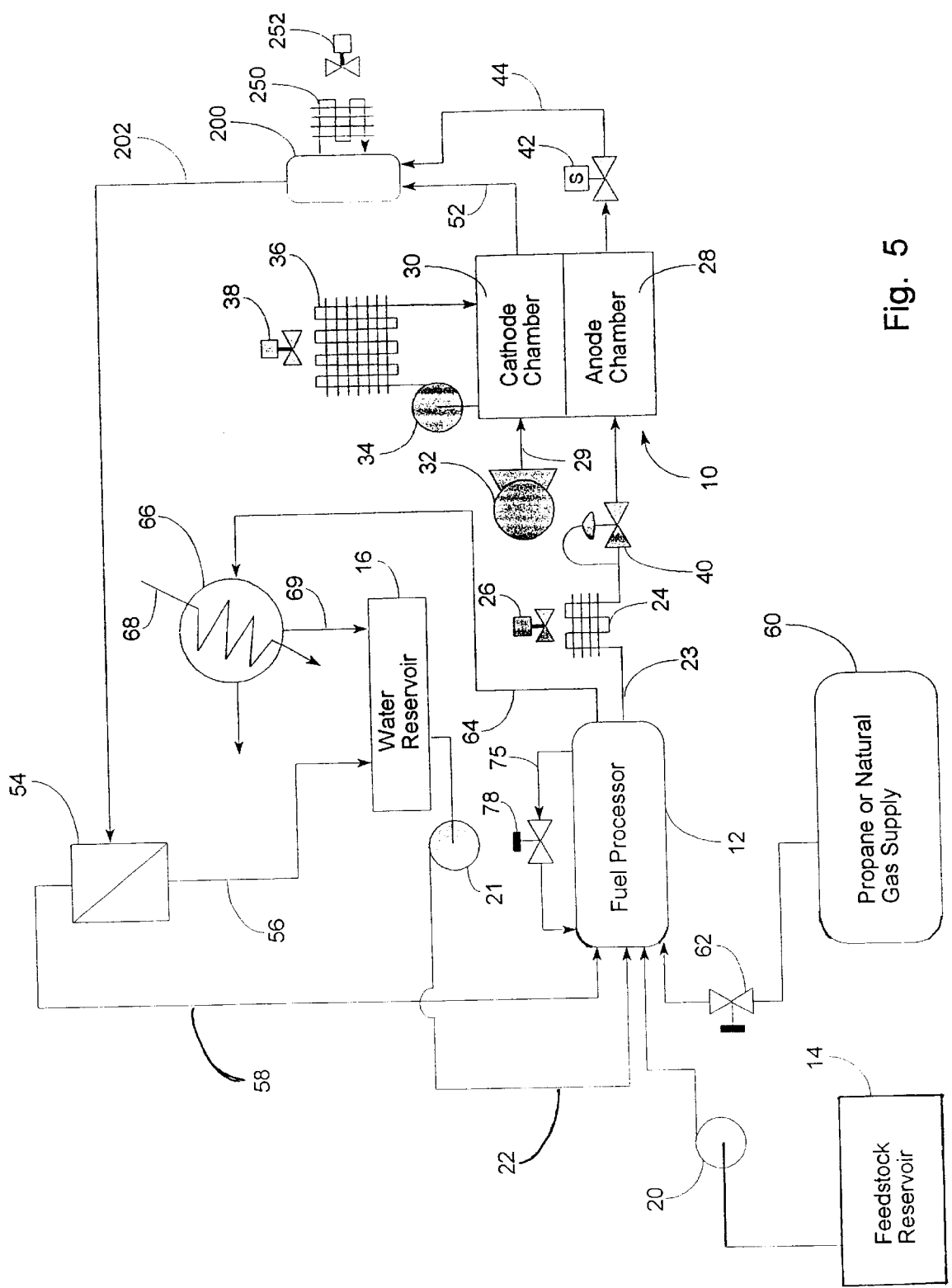
FIG. 5 is a process flow diagram of a fuel cell system in which hydrogen purged from the anode chamber of the fuel cell is combusted to provide additional heat and water for recovery and use.

In yet another embodiment of the present invention, heat is recovered in addition to water recovery from combustion of purge hydrogen 44. FIG. 5 shows combustor 200 coupled to heat exchanger 250 for the purpose of recovering and using heat generated by combustion of purge hydrogen stream 44 within said combustor 200. Heat exchanger 250 may be simply heat-conductive fins on the exterior of combustor 200, or a heat exchange fluid may be passed between combustor 200 and heat exchanger 250. Said heat exchange fluid may be circulated based on natural convection currents, or it may be forcibly circulated by a circulation pump. To utilize the recovered heat a suitable cold fluid stream is passed over hot heat exchanger 250. One such suitable cold fluid stream is air, in which case fan 252 blows a cold air stream over heat exchanger 250 resulting in an increase in the temperature of said air stream. Other suitable cold fluids include, but are not limited to, water, ethylene glycol, propylene glycol, and both the feedstock and feed water to be fed to fuel processor 12.

Figure 6:
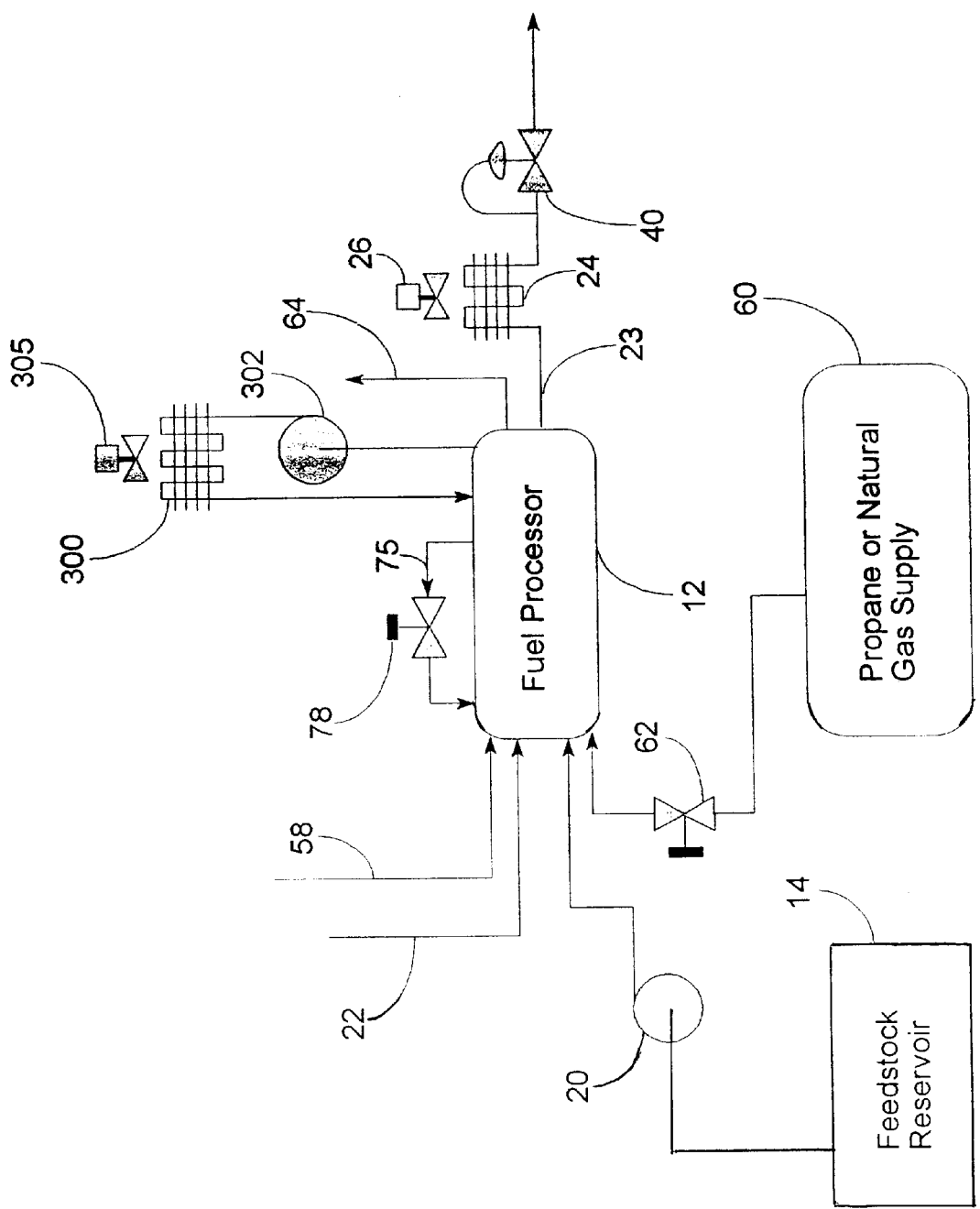
FIG. 6 is an embodiment of the invention in which high-grade heat is recovered from the fuel processor.

Useful heat can also be recovered from fuel processor 12. FIG. 6 shows this embodiment of the invention. Heat exchanger 300 extracts heat from the high-temperature combustion regions of fuel processor 12. Pump 302 may be used to circulate a heat transfer fluid between fuel processor 12 and heat exchanger 300, as shown in FIG. 6, or circulation of said heat transfer fluid may be based on naturally occurring convection currents. Alternatively, heat exchanger 300 may comprise a series of heat-conductive fins placed on the hot regions of the fuel processor. For purposes of heat recovery and use, a suitable cold fluid is passed over the hot heat exchanger 300. Such a suitable cold fluid may be an air stream supplied by fan 305. In this case said air stream is heated by passing over hot heat exchanger 300. Other suitable cold fluid streams include, but are not limited to, water, ethylene glycol, and propylene glycol.

Figure 7:
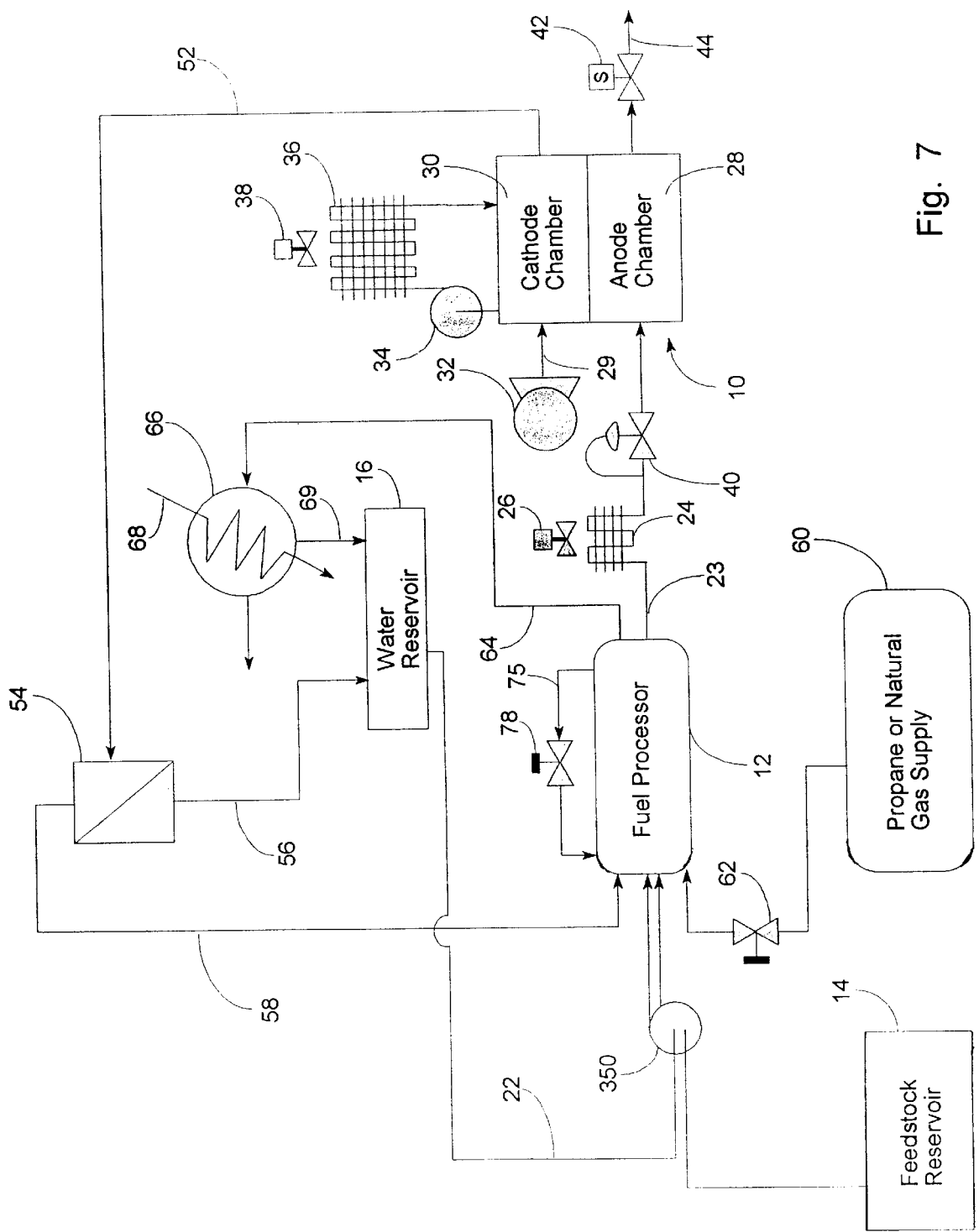
FIG. 7 shows another embodiment of the invention comprising a dual pump head in which a single motor is used to simultaneously drive two pump heads that deliver both the feedstock and water to the fuel processor.

Another useful embodiment of the present invention is shown in FIG. 7. Dual-head pump 350 supplies both feedstock from reservoir 14 and feed water from reservoir 16 to fuel processor 12. Dual-head pump 350 comprises two pump heads driven by a single drive motor such that both pump heads are driven at the same speed over the entire operating speed range of the pump motor. The pumping rate of each feedstock and feed water is determined by the displacement of each respective cavity in dual-head pump 350. For example, to preserve a fixed ratio of feed water to feedstock, as is desirable for steam reforming, the dual-head pump may be a gear pump with a ratio of displacement volume of the two pump heads being 3:1. Thus, if the larger displacement pump head supplied feed water to the fuel processor, and the smaller displacement pump head supplied feedstock (e.g., a liquid hydrocarbon), then the flow rate of feed water would be three times greater than the flow rate of feedstock into the fuel processor. This ratio would be essentially constant over the entire range of delivery rates achievable with the dual-head pump since this ratio is fixed by the displacement volumes of each of the two pump heads and both pump heads are driven at the same speed by the same drive motor. Suitable types of dual-head pumps include, but are not limited to, gear pumps, piston pumps, diaphragm pumps, and peristaltic pumps.

Figure 8:
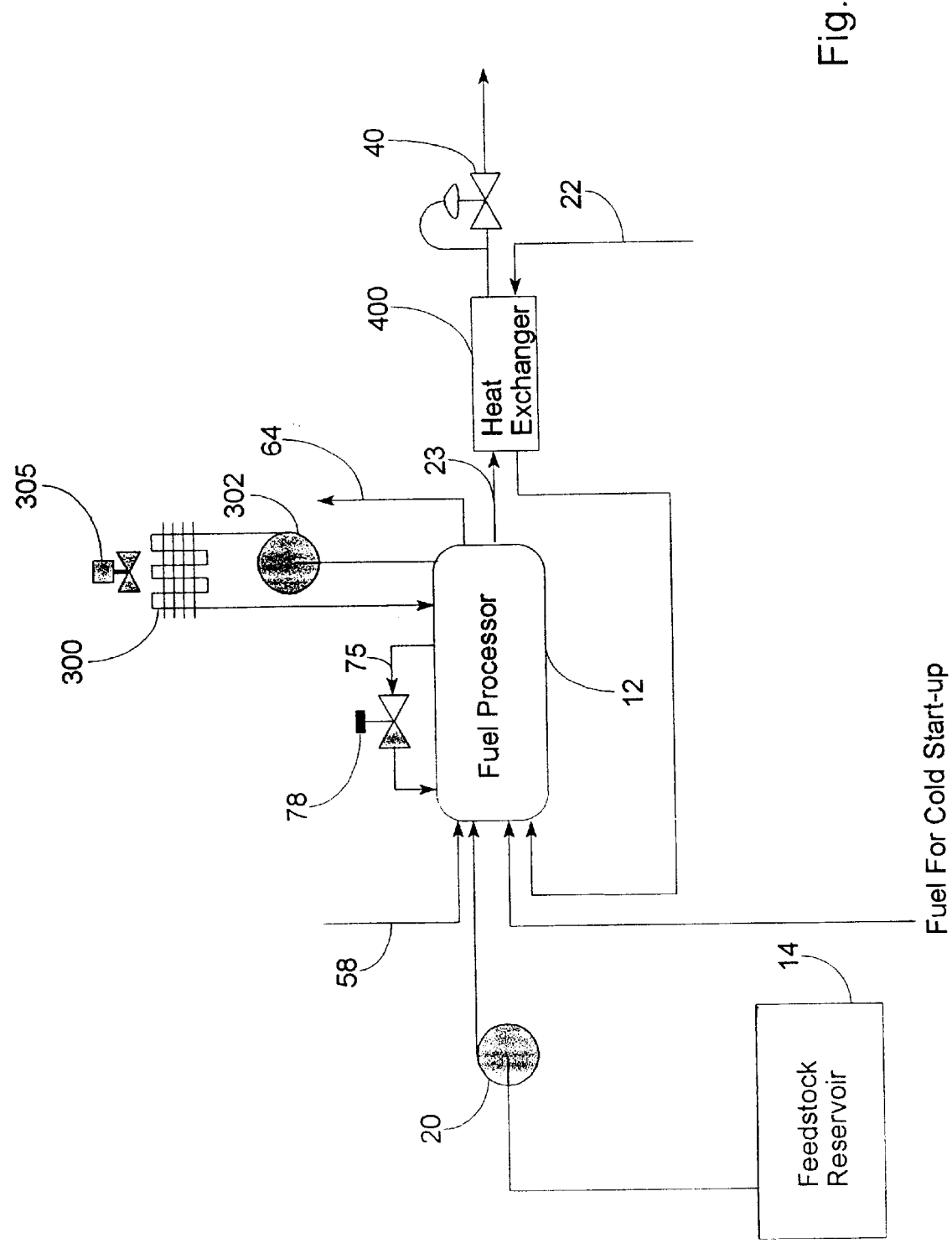
FIG. 8 shows yet another embodiment of the invention adapted to preheat either the feedstock or feed water prior to delivery to the fuel processor by heat exchange with hot hydrogen exiting the fuel processor.

Yet another embodiment of this invention utilizes the hot product hydrogen stream 23 as it exits fuel processor 12 to pre-heat feed water stream 22 prior to introduction of said feed water into the fuel processor. As shown in FIG. 8, feed water stream 22 enters a counter-current heat exchanger 400. Hot product hydrogen stream 23 also flows into counter-current heat exchanger 400. The feed water stream and the hydrogen stream are isolated from each other, but are in thermal contact such that the hot hydrogen stream is cooled during passage through heat exchanger 400 and the feed water stream is warmed during its passage through heat exchanger 400. When the invented system of FIG. 8 is used, it is preferable that product hydrogen stream 23 is cooled to a temperature at or near the operating temperature of the fuel cell (typically between approximately 40° C. and approximately 60° C.).

Maintaining acceptable water purity in the cooling loop for fuel cell 28 is an important aspect of the successful operation of a PEMFC system. Often, to achieve this objective, fuel cell manufacturers specify stainless steel for all wetted surfaces of the PEMFC cooling loop. This leads to considerable expense, especially since stainless steel radiators (heat exchangers) are expensive and, by virtue of the relatively poor thermal conductivity of stainless steel, large in size.

Figure 9:
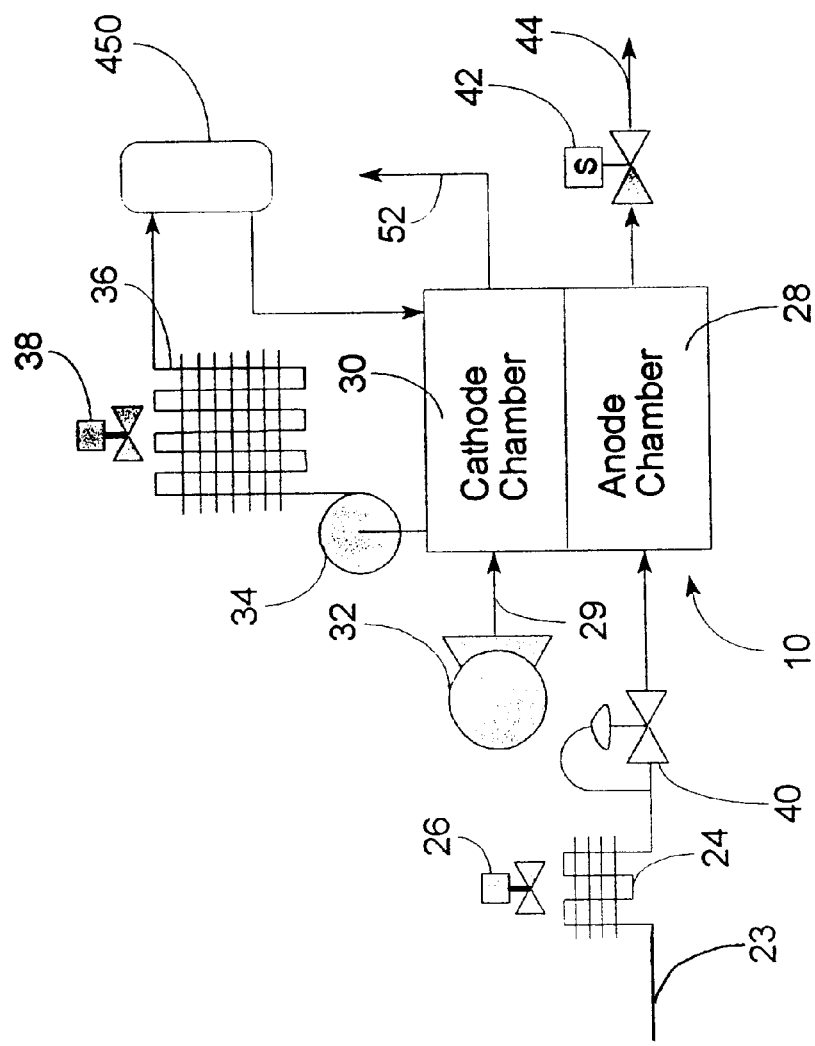
FIG. 9 shows yet another embodiment of the invention comprising one or more ion-exchange beds to maintain low electrical conductivity of the process water.

FIG. 9 shows an embodiment of this invention that overcomes the need to use stainless steel components throughout the cool loop of the fuel cell, thereby improving the performance of said cooling loop and decreasing its cost. This objective is achieved by placing an ion exchange bed 450 in the cooling loop so that cooling water passes through the ion exchange bed during operation of the system. Either all of the cooling water or a portion of the cooling water is passed through the ion exchange bed. Since the objective is to maintain low ionic (both cationic and anionic) concentrations in the cooling water, ion exchange bed 450 should comprise both cation-exchange resins and anion-exchange resins.

If a slip stream of cooling water is passed through ion exchange bed 450, the flow rate of said slip stream is sized to maintain sufficiently low ionic concentration in the cooling water. Because the cooling water typically passes over electrically charged surfaces within the PEMFC, it is important that the cooling water have a high electrical resistance, but it is not essential that the cooling water be of ultra-high purity with respect to ionic and non-ionic content.

Figure 10:
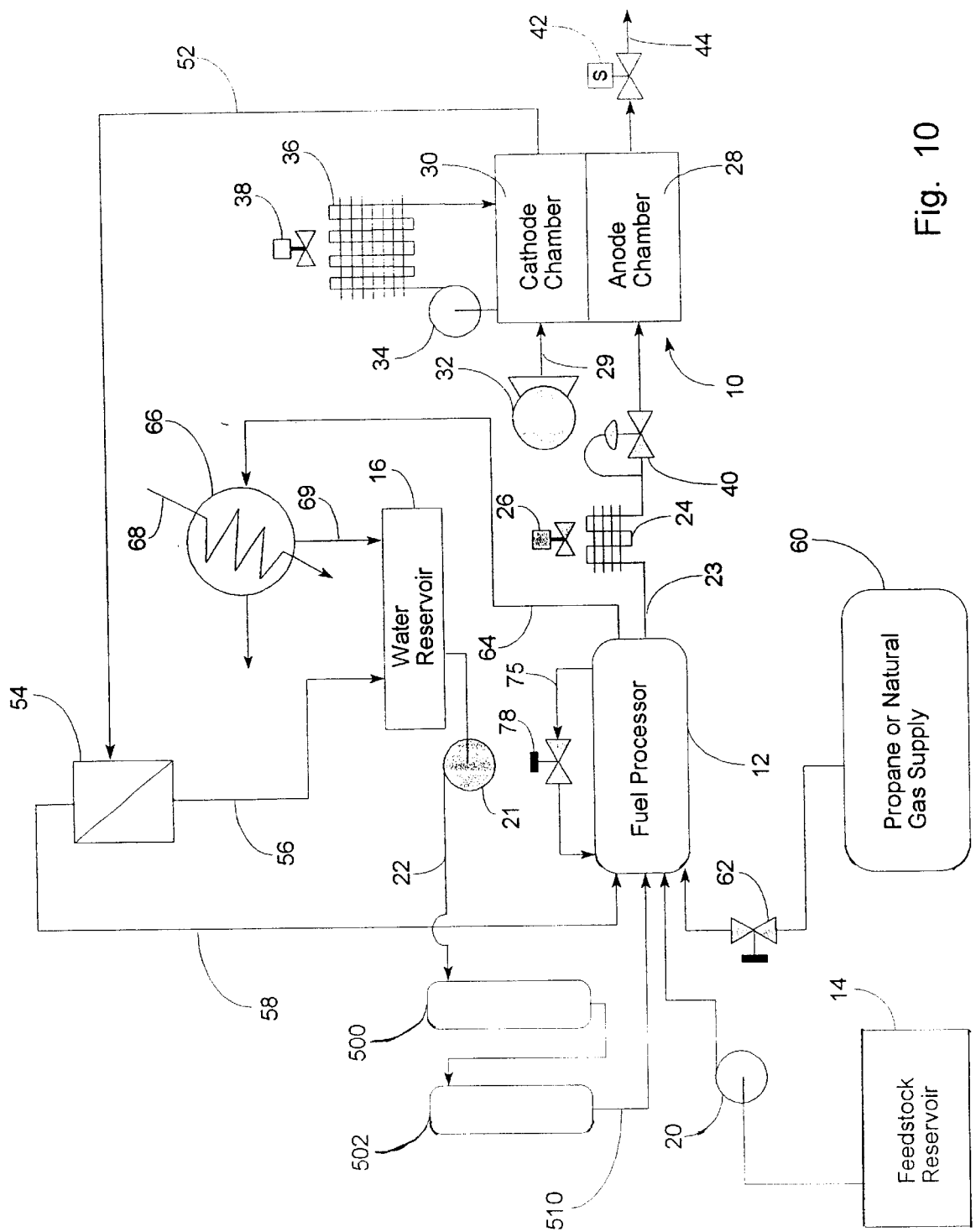
FIG. 10 shows a process flow diagram for a fuel cell system in which ion exchange and activated carbon beds are used to purify feed water prior to injection into the fuel processor.

It is also important to maintain acceptable levels of purity in the feed water that is to be used within fuel processor 12 so that the steam-reforming catalysts within said fuel processor are not poisoned and rendered non-effective. FIG. 10 shows activated carbon bed 500 and ion exchange bed 502 placed in feed water stream 22 for the purpose of purifying said feed water of ionic and organic contaminants. The now purified feed water stream 510 is then admitted into fuel processor 12. Activated carbon bed 500 removes organic impurities from feed water stream 22. Such organic impurities may originate from a variety of sources including, but not limited to, combustion byproducts that are exhausted from fuel processor 12 and carried in exhaust stream 64 to condenser 66, and from there into condensed liquid water stream 69. Ion exchange bed 502 comprises both cation-exchange resins and anion-exchange resins, thereby removing both cations and anions from feed water stream 22. Ionic contamination of feed water stream 22 may originate from a variety of sources including, but not limited to, corrosion of metallic wetted surfaces in the combustion exhaust line carrying exhaust stream 64, is condenser 66, the line carrying condensed liquid water stream 69 to water reservoir 16, and water reservoir 16. The incorporation of ion exchange bed 502 allows the use of materials that are not especially corrosion resistant, but exhibit good thermal conductivity and relatively low cost, for the aforementioned wetted parts of the system, thereby improving the performance of condenser 66 and reducing the cost of the system.

The foregoing description of the preferred embodiments of the invention has been presented for purposes of illustration and description. It is not intended to be exhaustive or to limit the invention to the precise form disclosed, and many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A fuel cell system, comprising:
   a fuel processor adapted to receive a feed stream containing a carbon-containing feedstock and to produce a byproduct stream and a product hydrogen stream containing hydrogen gas therefrom, wherein the fuel processor includes a hydrogen-production region, in which the feedstock is reacted at an elevated temperature to form a product stream containing hydrogen gas, and a separation region containing at least one hydrogen-selective membrane adapted to separate the product stream into the product hydrogen stream and a byproduct stream;
   a fuel cell stack adapted to receive the product hydrogen stream and produce an electric current therefrom; and a feedstock reservoir containing a carbon-containing feedstock;

a water reservoir containing water; and a pump assembly adapted to draw a feed stream containing feedstock from the feedstock reservoir and a water stream containing water from the water reservoir and to deliver the feed and water streams to the fuel processor, wherein the pump assembly includes a plurality of synchronized pump heads adapted to pump fluid from a corresponding plurality of pump cavities, wherein one of the pump cavities is adapted receive feedstock from the feedstock reservoir and one of the pump cavities is adapted to receive water from the water reservoir.

2. The fuel cell system of claim 1, wherein the pump heads are driven by a common motor.

3. The fuel cell system of claim 1, wherein the cavities are sized to deliver a selected ratio of feedstock to water defined by the relative volumes of the cavities.

4. The fuel cell system of claim 1, wherein the cavities are of different sizes.

5. The fuel cell system of claim 1, wherein the fuel processor includes a shell in which the hydrogen-production region and separation region are housed.

6. The fuel cell system of claim 2, wherein the fuel processor is a steam reformer.

7. The fuel cell system of claim 1, wherein the fuel processor is an autothermal reformer.

8. The fuel cell system of claim 1, wherein the fuel processor is adapted to produce the product stream by partial oxidation of the feedstock.

9. The fuel cell system of claim 1, wherein the fuel processor includes a combustion region in which a fuel stream is combusted to heat the fuel processor, wherein in the combustion region includes an exhaust through which a combustion exhaust stream is removed from the fuel processor, and further wherein the system further includes means for recovering water from the combustion exhaust stream.

10. The fuel cell system of claim 9, wherein the means for recovering water includes a condenser adapted to condense water vapor in the combustion exhaust stream.

11. The fuel cell system of claim 10, wherein the means for recovering water is adapted to deliver water from the condenser to the water reservoir.

12. The fuel cell system of claim 1, wherein the system further includes means for storing a selected portion of the product hydrogen stream.

13. The fuel cell system of claim 12, wherein the selected portion is in the range of 0–100% of the product hydrogen stream.

14. The fuel cell system of claim 12, wherein the means for storing includes at least one hydride bed.

15. A fuel cell system, comprising:

a fuel processor adapted to receive a feed stream containing a carbon-containing feedstock and to produce a byproduct stream and a product hydrogen stream containing hydrogen gas therefrom, wherein the fuel processor includes a hydrogen-production region, in which the feedstock is reacted at an elevated temperature to form a product stream containing hydrogen gas, and a separation region containing at least one hydrogen-selective membrane adapted to separate the product stream into the product hydrogen stream and a byproduct stream;

a fuel cell stack adapted to receive the product hydrogen stream and produce an electric current therefrom; and a feedstock reservoir containing a carbon-containing feedstock;

a water reservoir containing water;

a pump assembly adapted to draw a feed stream containing feedstock from the feedstock reservoir and a water stream containing water from the water reservoir and to deliver the feed and water streams to the fuel processor; and means for removing impurities from the water stream.

16. The fuel cell system of claim 15, wherein the means for removing impurities includes an ion-removal assembly adapted to remove impurities from the water stream.

17. The fuel cell system of claim 16, wherein the ion-removal assembly includes at least one anion-exchange resin.

18. The fuel cell system of claim 16, wherein the ion-removal assembly includes at least one cation-exchange resin.

19. The fuel cell system of claim 15, wherein the means for removing impurities includes an activated carbon bed adapted to remove impurities from the water stream.

20. A fuel cell system, comprising:

a fuel processor adapted to receive a feed stream containing a carbon-containing feedstock and to produce a byproduct stream and a product hydrogen stream containing hydrogen gas therefrom, wherein the fuel processor includes a hydrogen-production region, in which the feedstock is reacted at an elevated temperature to form a product stream containing hydrogen gas, and a separation region containing at least one hydrogen-selective membrane adapted to separate the product stream into the product hydrogen stream and a byproduct stream;

a fuel cell stack adapted to receive the product hydrogen stream and produce an electric current therefrom, wherein the fuel cell stack includes a purge valve through which a purge stream containing hydrogen gas is exhausted from the fuel cell stack;

a feedstock reservoir containing a carbon-containing feedstock;

a water reservoir containing water;

a pump assembly adapted to draw a feed stream containing feedstock from the feedstock reservoir and a water stream containing water from the water reservoir and to deliver the feed and water streams to the fuel processor; and a combustor adapted to combust the purge stream.

21. The fuel cell system of claim 20, wherein the system includes a recovery assembly adapted to recover water from the combustor.

22. The fuel cell system of claim 21, wherein the recovery assembly is further adapted to deliver recovered water to the water reservoir.

23. The fuel cell system of claim 20, wherein the system is adapted to heat the feed stream through heat exchange with the combustor.

24. The fuel cell system of claim 20, wherein the system is adapted to heat the water stream through heat exchange with the combustor.

25. A fuel cell system, comprising:

a fuel processor adapted to receive a feed stream containing a carbon-containing feedstock and to produce a byproduct stream and a product hydrogen stream containing hydrogen gas therefrom, wherein the fuel processor includes a hydrogen-production region, in which the feedstock is reacted at an elevated temperature to form a product stream containing hydrogen gas, and a separation region containing at least one hydrogen-selective membrane adapted to separate the product stream into the product hydrogen stream and a byproduct stream;

a fuel cell stack adapted to receive the product hydrogen stream and produce an electric current therefrom; and a feedstock reservoir containing a carbon-containing feedstock;

a water reservoir containing water;

a pump assembly adapted to draw a feed stream containing feedstock from the feedstock reservoir and a water stream containing water from the water reservoir and to deliver the feed and water streams to the fuel processor; and a heat exchange assembly adapted to cool at least one of the product hydrogen stream and the fuel cell stack with a heat exchange fluid stream.

26. The fuel cell system of claim 25, wherein the heat exchange assembly is adapted to cool the product hydrogen stream prior to delivery to the fuel cell stack.

27. The fuel cell system of claim 26, wherein the heat exchange fluid stream is an air stream and the heat exchange assembly includes a fan adapted to deliver the air stream into thermal communication with the product hydrogen stream.

28. The fuel cell system of claim 26, wherein the heat exchange fluid steam includes the feed stream.

29. The fuel cell system of claim 26, wherein the heat exchange fluid stream includes a water stream.

30. The fuel cell system of claim 26, wherein the heat exchange fluid stream includes the water stream from the water reservoir.

31. The fuel cell system of claim 26, wherein the heat exchange fluid stream includes at least one glycol.

32. The fuel cell system of claim 25, wherein the heat exchange assembly includes a purification assembly adapted to remove impurities from the heat exchange fluid stream.

33. The fuel cell system of claim 25, wherein the heat exchange assembly includes a coolant loop containing the heat exchange fluid stream and a pump assembly adapted to circulate the heat exchange fluid stream within the coolant loop.

34. The fuel cell system of claim 33, wherein the heat exchange fluid stream includes air.

35. The fuel cell system of claim 33, wherein the heat exchange fluid stream includes water.

36. The fuel cell system of claim 33, wherein the heat exchange fluid stream includes at least one glycol.

37. The fuel cell system of claim 33, wherein the heat exchange assembly includes a purification assembly adapted to remove impurities from the heat exchange fluid stream.

* * * * *

UNITED STATES PATENT AND TRADEMARK OFFICE
CERTIFICATE OF CORRECTION

PATENT NO. : 6,376,113 B1
DATED : April 23, 2002
INVENTOR(S) : David J. Edlund et al.

It is certified that error appears in the above-identified patent and that said Letters Patent is hereby corrected as shown below:

<u>Column 9,</u>
Line 11, after "adapted" please insert -- to --.
Line 25, please delete "claim 2" and insert -- claim 1 --.
Line 34, after "wherein" please delete "in".

Signed and Sealed this

Eighth Day of October, 2002

*Attest:*

*Attesting Officer*

JAMES E. ROGAN
*Director of the United States Patent and Trademark Office*